US012220939B1

(12) United States Patent
Twigg et al.

(10) Patent No.: US 12,220,939 B1

(45) Date of Patent: Feb. 11, 2025

(54) LOCKING MARKER CAP ASSEMBLY AND METHOD OF USE

(71) Applicants: Joseph William Twigg, San Tan Vly, AZ (US); Richard Lee Twigg, Cornelius, OR (US)

(72) Inventors: Joseph William Twigg, San Tan Vly, AZ (US); Richard Lee Twigg, Cornelius, OR (US)

( * ) Notice: Subject to any disclaimer, the term of this patent is extended or adjusted under 35 U.S.C. 154(b) by 0 days.

(21) Appl. No.: 18/669,357

(22) Filed: May 20, 2024

(51) Int. Cl.
*B43K 23/12* (2006.01)

(52) U.S. Cl.
CPC .................................... *B43K 23/12* (2013.01)

(58) Field of Classification Search
CPC ........ B43K 23/08; B43K 23/10; B43K 23/12; B43K 23/122; B43K 23/124; B43K 23/126; B43K 23/128; B65D 50/041
See application file for complete search history.

(56) References Cited

U.S. PATENT DOCUMENTS 863,915 A * 8/1907 Graves ................. B43K 23/126 401/98
1,586,369 A * 5/1926 Koplow ................. B43K 23/12 403/329
2,061,214 A * 11/1936 Sentman .............. B65D 50/041 215/220
6,149,335 A * 11/2000 Smith ...................... B43K 7/08 401/209
8,408,831 B2 * 4/2013 Paradise ................ B43K 31/00 401/98
10,532,600 B1 * 1/2020 Moore ................... B43K 5/005
2006/0029460 A1 * 2/2006 Russo .................... B43K 23/00 401/98
2012/0003030 A1 * 1/2012 Kish ...................... B43K 23/12 401/202
2020/0062022 A1 * 2/2020 Nakata ................... B43K 23/02

FOREIGN PATENT DOCUMENTS

WO WO-2011054028 A1 * 5/2011 ........... B43K 23/124

* cited by examiner

*Primary Examiner* — David P Angwin
*Assistant Examiner* — Bradley S Oliver
(74) *Attorney, Agent, or Firm* — Mark S Hubert PC

(57) ABSTRACT

A locking cap system for a marker pen that can be manufactured onto or retrofit onto a standard, commercially available marker pen. It uses a removeable lock ring (or the equivalent formed onto the nose cone of the marker) and a locking cap. The lock ring is slid over, and partially down the marker barrel until its circular inner face frictionally engages the exterior perimeter of the marker barrel. The exterior surface of the lock ring is conformed for locking mechanical engagement with the locking cap. This may be with engaging threads and a freewheeling inner cap liner that is depressed for locked engagement with an outer cap, or it may with via a set of outwardly expandable tabs on the lock ring that are conformed for engagement in a set of mating slots in the cap. There are two embodiments.

3 Claims, 4 Drawing Sheets

2
4
6
8
10
12
14
16
18
20
22
24
26
28
30
32
99

LOCKING MARKER CAP ASSEMBLY AND METHOD OF USE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to markers and pens, and more particularly to the technology of increasing their longevity and limiting of their use toddlers . . . .

BACKGROUND

Most common pen style fluid markers consist of a marking fluid, a sealed fluid reservoir body (barrel and nose cone), an absorbent wick that extends through the fluid reservoir and terminates in a chisel, blunted or pointed marking fluid dispensing tip, and a sealing cap that envelops the tip and secures to the reservoir body. The sealing cap is generally frictionally secured only to the reservoir body. The entire assembly comprises a fluid marker. These are commonly used for bold marking on all smooth or rough surfaces, including but not limited to paper, wood, steel, plastic, painted surfaces, glass, ceramics, stone, tile, metals and the like. These style of markers are expensive.

Since these markers use a capillary wicking for the movement of the marking fluid from the reservoir to the tip, as marking fluid evaporates from the tip more is transported there enabling it to also evaporate. Hence, the largest drawback of a pen fluid markers is the evaporation of all their marking fluid when the dealing cap is left off, only partially secured to the reservoir body or accidentally knocked loose or off. Even if this problem is caught reasonably quickly, it still renders the marker pen useless for a short period until it can be resealed with the cap and the fluid is allowed to slowly wick from the reservoir body to the tip.

Additionally, because the fluid marker dispenses a fluid rather than say a soft graphite, the marking extends well below the surface in porous materials, making these marks impossible to remove. A dislodged cap has ruined many a shirt. Unfortunately, since we teach our children to color with larger writing utensils, their young minds don't distinguish fluid markers and many a child has done irreparable damage to surfaces.

Both the aforementioned problems occur because of the industry standard weak, friction fit sealing caps.

Thus, a simple solution to the weak, friction fit sealing cap to reservoir body interface is provided by the embodiments set forth below.

Henceforth, a secure way to seal a fluid marker would fulfill a long felt need in the industry. This new invention utilizes and combines known and new technologies in a unique and novel configuration to overcome the aforementioned problems and accomplish this.

BRIEF SUMMARY

In accordance with various embodiments, a locking fluid marker cap assembly is provided that may be retrofit onto a plethora of different manufacturer's marker pens.

In one aspect, a locking marker cap assembly that is a replacement for a conventional, friction fit marker cap is provided.

In another aspect, a two part locking marker cap that can be retrofitted onto a plethora of conventional markers.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figures 1, 2, 3, 4, 5:
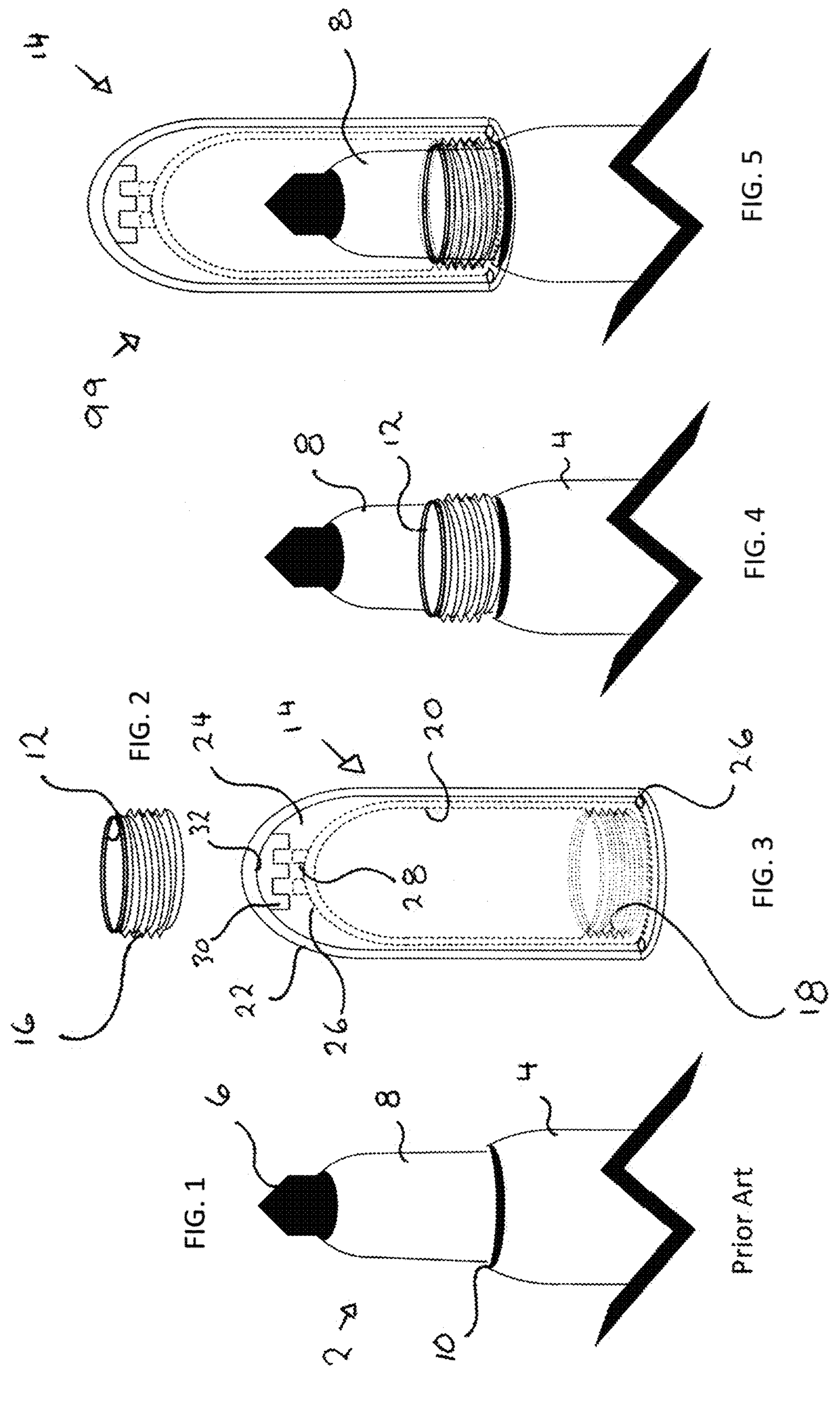
FIG. 1 Prior Art
FIG. 1 is a; partial cutaway view of a prior art marker barrel and nose cone.
FIG. 2 is a perspective view of a first embodiment lock ring.
FIG. 3 is a cross sectional view of a first embodiment locking cap.
FIG. 4 is a side view of a marker with a first embodiment lock ring installed.
FIG. 5 is a side view of a marker with a first embodiment lock ring installed and a first embodiment locking cap (shown in phantom) locked onto the lock ring.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another.

It will be understood that when an element is referred to as being "on," "coupled to," or "connected to" another element, it can be directly on, directly coupled to or directly connected to the other element, or intervening elements may be present. In contrast, when an element is referred to as being "directly on," "directly coupled to," or "directly connected to" another element, there are no intervening elements present.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "marker" refers to any of a pen-like style of marker whether it be of a fluid dispensing style, a gel or hard frictionally transferable media such as graphite, wax, soapstone or similar material. The term a "marker" is the same as a "marker pen."

As used herein the term "cap" refers to the sealing cap for the marker that attaches to the marker body.

As used herein the term "marker body" is the same as "marker barrel", "barrel" or "body."

The present invention relates to a novel design for a locking marker cap that can be incorporated by fabrication onto new markers, or can be retrofit onto existing markers.

The present locking cap is presented in two embodiments, each utilizing a locking cap and a lock ring that can be integrated by fabrication onto new markers, or can be retrofit onto existing markers so as to mechanically engage and create a lockable marker. This will prevent unintended markings as well as preventing the fluid dispensing tip from prematurely drying out. The overarching concept of both embodiments is the same however, they differ in their mechanical locks.

Looking at FIG. 1 a typical marker 2 is illustrated, showing the basic design of a barrel 4 coupled at its proximal end 10 to a nose cone 8 with a wicking style tip 6 extending from a leakproof orifice formed through the proximal end of the nose cone 8. The standard cap is not illustrated, but generally, it is a one piece cover that is conically tapered so as to frictionally engage the outer surface of the nose cone 8.

The first embodiment removeable lock ring 12 of FIG. 2 and the first embodiment locking cap 14 of FIG. 3, together form the first embodiment locking marker cap assembly 99. (FIG. 5)

The first embodiment lock ring 12 is a circular ring with an exterior thread 16 formed thereon. Preferably, it is made of a polymer with a durometer flexible enough to expand slightly to firmly frictionally fit the nose cone 8 and having a "grippy" (non-glossy or slippery) surface finish. As can be seen in FIG. 4, the lock ring 12 is slid down on the nose cone 8 until it abuts the barrel 4. At that point, the lock ring 12 will be frictionally affixed to the distal end of the nose cone 8. It is also known that engagement between the lock ring 12 and the nose cone 8 may also be accomplished by other means such as glue or double-sided tape between the inner face of the lock ring 12 and the distal outer surface of the nose cone 8. In this case the lock ring 12 may be of a harder material. It is expected that the material use for the expandable lock ring 12 will have durometer as measured on the Shore A hardness scale between 0 and 60, preferably in the 10 to 25 range. A non-expandable lock ring 12 will have a greater hardness.

The first embodiment locking cap 14 consists of an inner cap 20 and an outer cap 22. Each of these caps 20 and 22 are configured as round cylindrical domes however, the inner cap 20 is shorter in length and smaller in diameter than the outer cap 22. This disparity in their dimensional configurations allows the inner cap 20 to reside and float longitudinally within the volume 24 of the outer cap 22. There is a retention means 26 formed at the distal end of the outer cap 22 that faces inward (toward the center line of the cap 14) and extends beyond the inner cap 20. This is a physical barrier such as a ring or inward facing protrusion that constrains the inner cap 20 within the outer cap 22. The inner cap 20 has an internal thread 18 formed about its distal interior end that is threadingly engageable with the external thread 16 on the lock ring 12.

At the outer proximal end 26 of the inner cap 20 there is a first portion cap lock engagement means 28 that matingly meshes with a second portion cap lock engagement means 30 formed on the inner proximal end 32 of the outer cap 22. These two portions of cap lock engagement means 28 and 30, are separated by a gap 29 when the inner cap 20 is in contact with the retention means 26 of the outer cap 22. When the locking cap 14 is threaded to the lock ring 12 and the outer cap 22 is depressed toward the distal end of the marker 2, the inner cap 20 moves longitudinally in the outer cap 22 such that the gap is closed and the two portions of the cap engagement means 28 and 30 engage. Once the cap lock engagement means portions are engaged, the outer cap 22 will rotate with the inner cap 20 when twisted, and the locking cap 14 will thread on/off of the lock ring 12, opening the marker for use. The two portions of the cap lock engagement means 28 and 30 preferably are physically mating teeth or bevel/miter/internal gears, although there are numerous equivalent mechanical engagement equivalents. FIG. 5 shows the first embodiment locking cap assembly retrofittingly installed on a marker nose cone 8.

Figure 10:
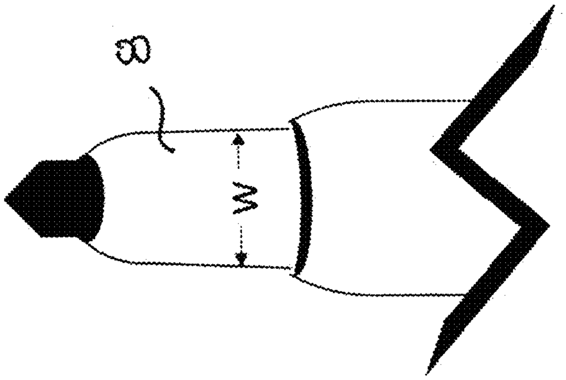
Prior Art FIG. 10
FIG. 10 is a side view of a prior art marker illustrating nose cone dimensions.
Figure 11:
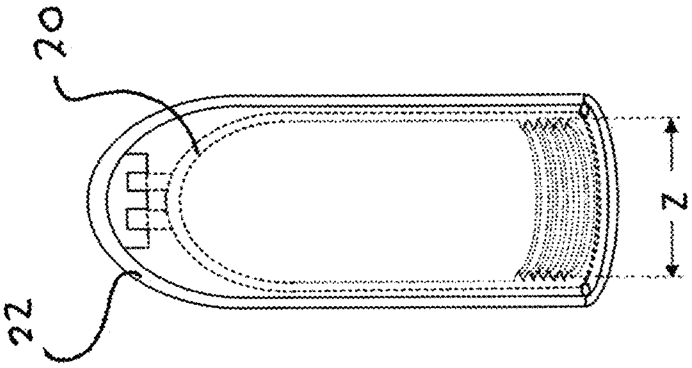
FIG. 11 is a side cross sectional view of a first embodiment locking cap illustrating dimensions of the inner locking cap.
Figure 12:
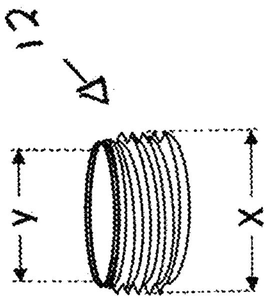
FIG. 12 is a side perspective view of the first embodiment lock ring illustrating dimensions.
Figure 13:
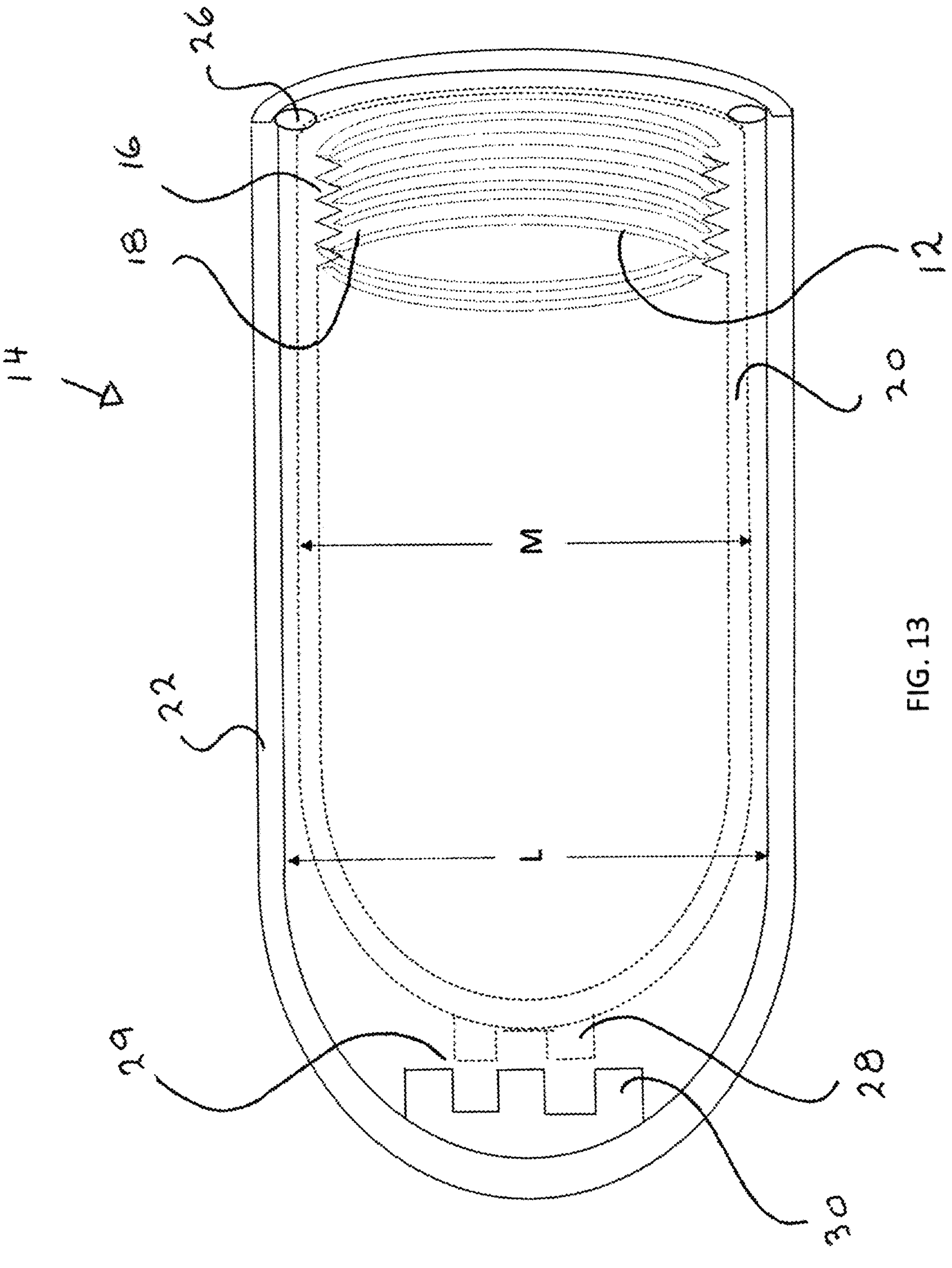
FIG. 13 is a side cross sectional view of the first embodiment locking cap illustrating dimensions.

As can be seen in FIGS. 10 to 12, the lock ring 12 in its unstretched configuration has an inner diameter Y that is smaller than the outer diameter W of the distal end of the nose cone 8 and in its expanded configuration is no larger than the outer diameter W of the distal end of the nose cone 8. Expressed in mathematical terms, Y≤ W. This dimensional relationship enables frictional engagement. Once frictionally engaged, the lock ring 12 presents its exterior thread 16, at the distal end of the nose cone 8 that has a root diameter X which is threadingly engageable with the root diameter Z of the internal thread 18 formed on the distal end of the inner cap 20. (FIG. 11) Looking at FIG. 13 it can be seen that the inner diameter L of the outer cap 22 exceeds the outer diameter M of the inner cap 20. It is the interactions between these six mechanical dimensions that allow the locking cap assembly to both work and be retrofit onto existing markers.

In operation, the lock ring 12 is affixed onto the distal end of the nose cone 8 of the marker 2 and the locking cap 14 is placed onto the marker 2 until the distal end of the inner cap 20 contacts the lock ring 12. The outer cap 20 is depressed toward the distal end of the marker 2 such that the first and second portion of the cap lock engagement means 28 and 30 engage and the cap 14 can be twisted clockwise onto the lock ring 12 such that internal thread 16 and external thread 18 mate and the locking cap 14 can be twistingly secured to the nose cone/barrel of the marker 2. The cap is now safely secured to the marker from inadvertent removal or a toddler's unwarranted removal. Removal of the first embodiment locking cap 14 can only be accomplished by again depressing the outer cap 22 to the point of engagement with the first and second portions engagement means 28 and 30 and twisting the first embodiment cap 14 in a counter-clockwise direction. The engagement of these threads 16 and 18 seals the tip 6 from excess marking fluid evaporation.

Figure 9:
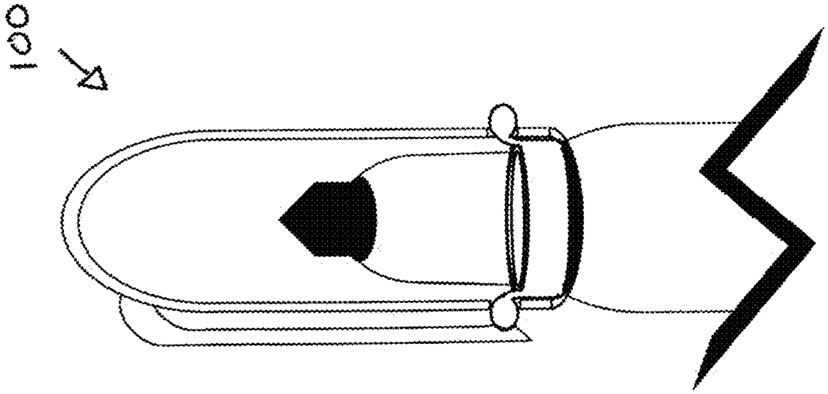
FIG. 9 is a side view of marker with a second embodiment locking ring installed and a second embodiment locking cap (shown in phantom) locked onto the lock ring.
Figure 8:
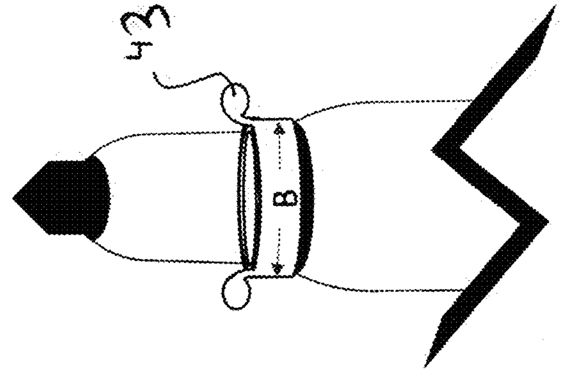
FIG. 8 is a side view of a second embodiment lock ring installed on a marker nose cone.
Figure 7:
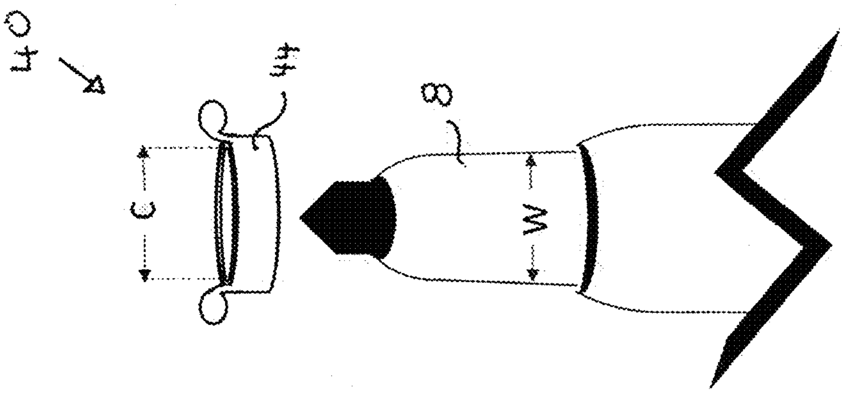
FIG. 7 is a side view of a second embodiment lock ring poised for installation over a marker.
Figure 6:
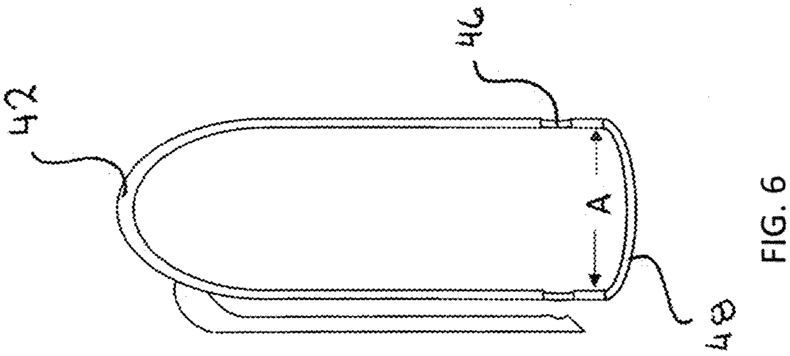
FIG. 6 is a side cross sectional view of a second embodiment locking cap.

The second embodiment removeable lock ring 40 of FIG. 7 and the second embodiment locking cap 42 of FIG. 6, together form the second embodiment locking marker cap assembly 100. (FIG. 9)

It is to be noted that while the preferred embodiment uses a removeable flexible lock ring, this lock ring can also be fabricated directly onto the nose cone of the marker. This version would look identical to that of FIG. 4.

Looking at FIGS. 6 to 9, it can be seen that the second embodiment lock ring 40 differs from the first embodiment lock ring 12 in that it has no external threads but rather has at least one flexible tab 43 (first portion lock engagement means) extending axially from its external perimeter. These tabs 43 flex toward the center of the second embodiment lock ring 40. The second embodiment lock ring 40 is also made of a polymer and has an internal diameter C that is sized for frictional engagement with the external diameter W of the nose cap 8.

The second embodiment locking cap 42 has at least one slot 46 (second portion lock engagement means) formed through its side wall adjacent the distal end 48. These slots 46 are sized to accept the passage of the flexible tabs 43 therethrough. This lockingly engages the second embodiment locking cap 42 to the second embodiment lock ring 44. The inner diameter A of the second embodiment locking cap 42 is the same as the outer diameter B of the second embodiment lock ring 44. This enables an airtight seal when the cap 42 is in place to prevent the tip 6 from drying out. When the second embodiment locking cap 42 is slid over the marker 2, its inner surface contacts the tab 43 and flexes it inward slightly until the slot 46 reaches the tab 43 and the tab expands (flexes outward) under its spring pressure to occupy the slot 46. The second embodiment locking cap 42 is now locked onto the second embodiment lock ring 44 and the marker 2. To remove the second embodiment locking cap 42, the tab 43 is depressed such that it clears the slot 46 and the second embodiment locking cap 42 is lifted off. The lock engagement means on the second embodiment locking cap is comprised of the tab 43 and slot 46. In the preferred embodiment there are at least two tabs 43 on the locking ring.

While certain features and aspects have been described with respect to exemplary embodiments, one skilled in the art will recognize that numerous modifications are possible. Moreover, while the procedures of the methods and processes for building, assembling and using the locking cap assemblies described herein are described in a particular order for ease of description, unless the context dictates otherwise, various procedures may be reordered, added, and/or omitted in accordance with various embodiments. Consequently, although two exemplary embodiments are described above, it will be appreciated that the invention is intended to cover all modifications and equivalents within the scope of the following claims.

Having thus described the invention, what is claimed as new and desired to be secured by Letters Patent is as follows:

1. A locking cap assembly for a pen style marker, comprising:

an expandable, polymer removeable circular, cylindrical lock ring deformable about and frictionally engageable over differing sizes of a nose cone of said pen style markers, said lock ring having an exterior thread formed thereon, and when in its unstretched configuration said lock ring has a inner diameter that is smaller than a outer diameter of a distal end of said nose cone, and in its expanded configuration is no larger than a outer diameter of said distal end of said nose cone;

a locking cap having an outer cap and an inner cap that resides and floats longitudinally within said outer cap, said inner cap having an interior thread formed thereon a distal interior end thereof;

an inwardly facing protrusion that constrains said inner cap within said outer cap;

a first portion lock engagement means formed on said inner cap; and a second portion lock engagement means formed on said outer cap; and wherein said first portion lock engagement means is matingly engageable with said second portion lock engagement means to allow the rotation of said inner cap and said outer cap in unison; and wherein exterior thread and said interior thread are threadingly engageable to connect said locking cap on top of said expandable lock ring.

2. A locking cap assembly for a pen style marker, comprising:

an expandable, removeable, polymer cylindrical lock ring conformed for frictional engagement over a nose cone of a variety of different sized said pen style markers, that when in its unstretched configuration said lock ring has a inner diameter that is smaller than a outer diameter of a distal end of said nose cone, and in its expanded configuration is no larger than a outer diameter of said distal end of said nose cone;

a first portion elastically deformable locking means formed thereon said lock ring;

a locking cap having a second portion locking means thereon; and wherein said first portion locking means and said second portion locking means are engageable to connect said locking cap to said nose cone.

3. The locking cap assembly of claim 2 wherein said first portion locking means is a pair of elastically deformable tabs formed on and extending from said lock ring and said second portion locking means is a pair of slots formed through said locking cap; and wherein said slots are sized for retention of said pair of tabs therein.

* * * * *